(12) United States Patent
Shekhar

(10) Patent No.: US 8,891,406 B1
(45) Date of Patent: Nov. 18, 2014

(54) METHODS AND APPARATUS FOR TUNNEL MANAGEMENT WITHIN A DATA CENTER

(75) Inventor: Ravi Shekhar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 791 days.

(21) Appl. No.: 12/976,508

(22) Filed: Dec. 22, 2010

(51) Int. Cl.
  *H04L 1/00*  (2006.01)
  *H04L 12/54* (2013.01)
  *H04L 12/46* (2006.01)

(52) U.S. Cl.
  CPC ........ *H04L 12/4633* (2013.01); *H04L 12/5689* (2013.01)
  USPC .......................................................... 370/255

(58) Field of Classification Search
  None
  See application file for complete search history.

(56) References Cited

U.S. PATENT DOCUMENTS

| | | | |
|---|---|---|---|
| 5,130,984 A | | 7/1992 | Cisneros |
| 5,138,615 A | | 8/1992 | Lamport et al. |
| 5,751,967 A | * | 5/1998 | Raab et al. ............. 709/228 |
| 5,801,641 A | | 9/1998 | Yang et al. |
| 5,818,842 A | * | 10/1998 | Burwell et al. ............. 370/397 |
| 5,892,912 A | * | 4/1999 | Suzuki et al. .......... 370/395.53 |
| 5,920,699 A | * | 7/1999 | Bare ........................ 709/225 |
| 6,011,779 A | | 1/2000 | Wills |
| 6,073,089 A | | 6/2000 | Baker et al. |
| 6,223,218 B1 | * | 4/2001 | Iijima et al. ............. 709/221 |
| 6,301,257 B1 | * | 10/2001 | Johnson et al. ........... 370/406 |
| 6,522,627 B1 | | 2/2003 | Mauger |
| 6,546,391 B1 | | 4/2003 | Tsuruoka |
| 6,553,002 B1 | | 4/2003 | Bremer et al. |
| 6,633,548 B2 | | 10/2003 | Bachmutsky et al. |
| 6,657,962 B1 | | 12/2003 | Barri et al. |
| 6,675,163 B1 | | 1/2004 | Bass et al. |
| 6,775,230 B1 | | 8/2004 | Watanabe et al. |
| 6,807,172 B1 | | 10/2004 | Levenson et al. |
| 6,934,252 B2 | | 8/2005 | Mehrotra et al. |
| 6,934,286 B2 | * | 8/2005 | Hwa et al. ............. 370/389 |
| 6,970,902 B1 | | 11/2005 | Moon |

(Continued)

FOREIGN PATENT DOCUMENTS

| | | |
|---|---|---|
| EP | 0 809 380 A2 | 11/1997 |
| GB | 2 361 139 A | 10/2001 |

OTHER PUBLICATIONS

Cisco: "Cisco VN-Link: Virtualization-Aware Networking," Cisco Public Information, Cisco Systems, [Online] Mar. 1, 2009 (pp. 1-10), XP002593596, Retrieved from the Internet: <URL: http://www.cisco.com/en/US/solutions/collateral/ns340/ns517/ns224/ns892/ns894/white_paper_c11-525307.pdf> [retrieved on Jul. 26, 2010].

(Continued)

*Primary Examiner* — Ayaz Sheikh
*Assistant Examiner* — Faiyazkhan Ghafoerkhan
(74) *Attorney, Agent, or Firm* — Cooley LLP

(57) ABSTRACT

A system includes multiple edge devices configured to be operatively coupled to a switch fabric. The switch fabric and the multiple edge devices collectively define at least a portion of a core portion of a data center. An edge device from the multiple edge devices is configured to receive a physical address value included in a request from a source peripheral processing device disposed outside of the core portion of the data center. The physical address value represents a destination of a packet queued at the source peripheral processing device. The edge device is configured to send, in response to the request, a tunnel value representing a physical address space including the physical address value to the source peripheral processing device.

20 Claims, 6 Drawing Sheets

(56) References Cited

U.S. PATENT DOCUMENTS

| | | | |
|---|---|---|---|
| 6,973,032 B1 | 12/2005 | Casley et al. | |
| 6,985,486 B1 | 1/2006 | Agrawal | |
| 7,027,412 B2 | 4/2006 | Miyamoto et al. | |
| 7,031,320 B2 | 4/2006 | Choe | |
| 7,069,413 B1 | 6/2006 | Agesen et al. | |
| 7,075,934 B2 | 7/2006 | Chiussi et al. | |
| 7,079,537 B1 | 7/2006 | Kanuri et al. | |
| 7,088,689 B2 * | 8/2006 | Lee et al. | 370/282 |
| 7,180,887 B1 | 2/2007 | Schwaderer et al. | |
| 7,221,676 B2 | 5/2007 | Green et al. | |
| 7,222,188 B1 * | 5/2007 | Ames et al. | 709/238 |
| 7,313,135 B2 | 12/2007 | Wyatt | |
| 7,315,547 B2 | 1/2008 | Yazaki et al. | |
| 7,327,680 B1 | 2/2008 | Kloth | |
| 7,366,181 B2 * | 4/2008 | Havala | 370/395.53 |
| 7,369,561 B2 | 5/2008 | Wybenga et al. | |
| 7,406,038 B1 | 7/2008 | Oelke et al. | |
| 7,409,487 B1 | 8/2008 | Chen et al. | |
| 7,415,034 B2 | 8/2008 | Muller et al. | |
| 7,426,518 B2 | 9/2008 | Venkatachary et al. | |
| 7,428,219 B2 | 9/2008 | Khosravi | |
| 7,430,164 B2 | 9/2008 | Bare | |
| 7,441,268 B2 | 10/2008 | Remedios | |
| 7,447,188 B1 * | 11/2008 | Dommety et al. | 370/342 |
| 7,515,589 B2 * | 4/2009 | Bacher et al. | 370/392 |
| 7,580,415 B2 | 8/2009 | Hudson et al. | |
| 7,630,368 B2 | 12/2009 | Tripathi et al. | |
| 7,636,360 B2 * | 12/2009 | Nagai et al. | 370/401 |
| 7,689,747 B2 | 3/2010 | Vega et al. | |
| 7,738,457 B2 | 6/2010 | Nordmark et al. | |
| 7,757,059 B1 | 7/2010 | Ofer et al. | |
| 7,769,031 B2 * | 8/2010 | Mitome et al. | 370/401 |
| 7,788,411 B2 | 8/2010 | Belgaied et al. | |
| 7,792,058 B1 * | 9/2010 | Yip et al. | 370/255 |
| 7,792,113 B1 * | 9/2010 | Foschiano et al. | 370/392 |
| 7,836,212 B2 | 11/2010 | Tripathi et al. | |
| 7,877,483 B1 * | 1/2011 | Finn | 709/227 |
| 7,885,268 B2 | 2/2011 | Pong | |
| 7,899,067 B2 | 3/2011 | Rangarajan et al. | |
| 7,903,658 B1 | 3/2011 | Kireeti et al. | |
| 7,966,421 B2 | 6/2011 | Brown | |
| 7,970,938 B1 * | 6/2011 | Lambeth et al. | 709/245 |
| 7,984,038 B2 | 7/2011 | Bass et al. | |
| 8,023,519 B2 | 9/2011 | Brown et al. | |
| 8,027,262 B2 * | 9/2011 | Kawarai et al. | 370/241 |
| 8,045,546 B1 | 10/2011 | Bao et al. | |
| 8,050,256 B1 | 11/2011 | Bao et al. | |
| 8,054,832 B1 | 11/2011 | Shukla et al. | |
| 8,068,442 B1 * | 11/2011 | Kompella | 370/256 |
| 8,179,900 B2 * | 5/2012 | Kitada | 370/395.53 |
| 8,190,769 B1 | 5/2012 | Shukla et al. | |
| 8,194,674 B1 * | 6/2012 | Pagel et al. | 370/393 |
| 8,255,496 B2 * | 8/2012 | Shukla et al. | 709/220 |
| 8,331,362 B2 | 12/2012 | Shukla et al. | |
| 8,369,333 B2 * | 2/2013 | Hao et al. | 370/392 |
| 8,417,865 B2 * | 4/2013 | Higuchi et al. | 710/313 |
| 2002/0048272 A1 | 4/2002 | Carvey | |
| 2002/0051427 A1 * | 5/2002 | Carvey | 370/254 |
| 2002/0052972 A1 * | 5/2002 | Yim | 709/245 |
| 2002/0080798 A1 | 6/2002 | Hariguchi et al. | |
| 2002/0080800 A1 * | 6/2002 | Lee et al. | 370/395.54 |
| 2002/0118644 A1 | 8/2002 | Moir | |
| 2002/0118682 A1 | 8/2002 | Choe | |
| 2002/0194294 A1 | 12/2002 | Blumenau et al. | |
| 2003/0026287 A1 | 2/2003 | Mullendore et al. | |
| 2003/0065878 A1 | 4/2003 | Krishna et al. | |
| 2003/0076849 A1 | 4/2003 | Morgan et al. | |
| 2003/0142668 A1 | 7/2003 | Wyatt | |
| 2004/0042416 A1 * | 3/2004 | Ngo et al. | 370/254 |
| 2004/0062208 A1 | 4/2004 | Brown et al. | |
| 2004/0083245 A1 | 4/2004 | Beeler | |
| 2004/0151188 A1 | 8/2004 | Maveli et al. | |
| 2004/0177157 A1 | 9/2004 | Mistry et al. | |
| 2004/0202171 A1 * | 10/2004 | Hama | 370/395.1 |
| 2004/0205253 A1 | 10/2004 | Arndt et al. | |
| 2005/0038848 A1 | 2/2005 | Kaluskar et al. | |
| 2005/0053079 A1 * | 3/2005 | Havala | 370/400 |
| 2005/0083949 A1 * | 4/2005 | Dobbins et al. | 370/395.53 |
| 2005/0138308 A1 | 6/2005 | Morishita et al. | |
| 2005/0177552 A1 | 8/2005 | Bass et al. | |
| 2005/0192969 A1 | 9/2005 | Haga et al. | |
| 2005/0198303 A1 | 9/2005 | Knauerhase et al. | |
| 2006/0013171 A1 * | 1/2006 | Ahuja et al. | 370/338 |
| 2006/0092860 A1 * | 5/2006 | Higashitaniguchi et al. | 370/255 |
| 2006/0173831 A1 | 8/2006 | Basso et al. | |
| 2006/0233168 A1 | 10/2006 | Lewites et al. | |
| 2006/0251065 A1 * | 11/2006 | Hamamoto et al. | 370/389 |
| 2006/0259952 A1 | 11/2006 | Lok | |
| 2006/0268911 A1 * | 11/2006 | Bergmann et al. | 370/409 |
| 2006/0274744 A1 * | 12/2006 | Nagai et al. | 370/389 |
| 2007/0005685 A1 | 1/2007 | Chau et al. | |
| 2007/0008949 A1 | 1/2007 | Balandin | |
| 2007/0014288 A1 | 1/2007 | Lim et al. | |
| 2007/0036178 A1 * | 2/2007 | Hares et al. | 370/490 |
| 2007/0078988 A1 | 4/2007 | Miloushev et al. | |
| 2007/0079307 A1 | 4/2007 | Dhawan et al. | |
| 2007/0098408 A1 | 5/2007 | Handelman | |
| 2007/0115968 A1 | 5/2007 | Brown | |
| 2007/0124486 A1 * | 5/2007 | Jeon et al. | 709/230 |
| 2007/0140235 A1 | 6/2007 | Aysan et al. | |
| 2007/0140263 A1 * | 6/2007 | Mitome et al. | 370/395.53 |
| 2007/0204265 A1 | 8/2007 | Oshins | |
| 2007/0211716 A1 | 9/2007 | Oz et al. | |
| 2007/0219911 A1 | 9/2007 | Abe | |
| 2007/0230481 A1 * | 10/2007 | Ikeda et al. | 370/395.53 |
| 2007/0244997 A1 | 10/2007 | Tindal | |
| 2007/0280243 A1 | 12/2007 | Wray et al. | |
| 2007/0280253 A1 | 12/2007 | Rooholamini et al. | |
| 2007/0283186 A1 | 12/2007 | Madnani et al. | |
| 2007/0288535 A1 | 12/2007 | Shitomi et al. | |
| 2007/0297428 A1 | 12/2007 | Bose et al. | |
| 2008/0002663 A1 | 1/2008 | Tripathi et al. | |
| 2008/0005344 A1 | 1/2008 | Ford et al. | |
| 2008/0019365 A1 | 1/2008 | Tripathi et al. | |
| 2008/0043756 A1 | 2/2008 | Droux et al. | |
| 2008/0043765 A1 | 2/2008 | Belgaied et al. | |
| 2008/0046610 A1 | 2/2008 | Tripathi et al. | |
| 2008/0046735 A1 | 2/2008 | Nedeltchev et al. | |
| 2008/0071961 A1 * | 3/2008 | Higuchi et al. | 710/312 |
| 2008/0080548 A1 | 4/2008 | Mullendore et al. | |
| 2008/0082977 A1 | 4/2008 | Araujo et al. | |
| 2008/0095361 A1 | 4/2008 | Wifvesson et al. | |
| 2008/0098392 A1 | 4/2008 | Wipfel et al. | |
| 2008/0117909 A1 | 5/2008 | Johnson | |
| 2008/0130517 A1 | 6/2008 | Lee et al. | |
| 2008/0148341 A1 | 6/2008 | Ferguson | |
| 2008/0155223 A1 | 6/2008 | Hiltgen et al. | |
| 2008/0186875 A1 | 8/2008 | Kitani | |
| 2008/0192648 A1 | 8/2008 | Galles | |
| 2008/0201709 A1 | 8/2008 | Hodges | |
| 2008/0205377 A1 | 8/2008 | Chao et al. | |
| 2008/0212592 A1 | 9/2008 | Wybenga et al. | |
| 2008/0219184 A1 | 9/2008 | Fowler et al. | |
| 2008/0225853 A1 | 9/2008 | Melman et al. | |
| 2008/0228781 A1 | 9/2008 | Chen et al. | |
| 2008/0240104 A1 | 10/2008 | Villait et al. | |
| 2008/0240122 A1 | 10/2008 | Richardson et al. | |
| 2008/0244579 A1 | 10/2008 | Muller | |
| 2008/0259934 A1 | 10/2008 | Matthews et al. | |
| 2008/0270564 A1 | 10/2008 | Rangegowda et al. | |
| 2008/0270606 A1 * | 10/2008 | Gooch et al. | 709/225 |
| 2008/0275872 A1 | 11/2008 | Venkatachary et al. | |
| 2009/0013062 A1 | 1/2009 | Blatherwick et al. | |
| 2009/0025007 A1 | 1/2009 | Hara et al. | |
| 2009/0037607 A1 * | 2/2009 | Farinacci et al. | 709/249 |
| 2009/0037680 A1 | 2/2009 | Colbert et al. | |
| 2009/0052461 A1 | 2/2009 | Brown et al. | |
| 2009/0083445 A1 | 3/2009 | Ganga | |
| 2009/0106409 A1 | 4/2009 | Murata | |
| 2009/0106766 A1 | 4/2009 | Masuda | |
| 2009/0109479 A1 | 4/2009 | Kato | |
| 2009/0135816 A1 | 5/2009 | Nandagopal et al. | |
| 2009/0135833 A1 * | 5/2009 | Lee et al. | 370/395.53 |
| 2009/0150529 A1 | 6/2009 | Tripathi | |

(56) References Cited

U.S. PATENT DOCUMENTS

| | | | |
|---|---|---|---|
| 2009/0157701 | A1 | 6/2009 | Lahiri et al. |
| 2009/0190598 | A1 | 7/2009 | Christensen et al. |
| 2009/0198761 | A1 | 8/2009 | Nanda et al. |
| 2009/0240790 | A1 | 9/2009 | Utsunomiya et al. |
| 2009/0274044 | A1 | 11/2009 | Goose et al. |
| 2009/0276772 | A1 | 11/2009 | Garrett et al. |
| 2009/0276774 | A1 | 11/2009 | Kinoshita |
| 2009/0292858 | A1 | 11/2009 | Lambeth et al. |
| 2009/0307597 | A1 | 12/2009 | Bakman |
| 2009/0313620 | A1 | 12/2009 | Sedukhin et al. |
| 2010/0027420 | A1 | 2/2010 | Smith |
| 2010/0042708 | A1 | 2/2010 | Stamler et al. |
| 2010/0042719 | A1 | 2/2010 | Kinoshita |
| 2010/0043068 | A1 | 2/2010 | Varadhan et al. |
| 2010/0050172 | A1 | 2/2010 | Ferris |
| 2010/0054129 | A1 | 3/2010 | Kuik et al. |
| 2010/0077158 | A1 | 3/2010 | Asano |
| 2010/0091961 | A1 | 4/2010 | Jones et al. |
| 2010/0128605 | A1 | 5/2010 | Chavan et al. |
| 2010/0131636 | A1 | 5/2010 | Suri et al. |
| 2010/0165876 | A1 | 7/2010 | Shukla et al. |
| 2010/0165877 | A1 | 7/2010 | Shukla et al. |
| 2010/0169467 | A1 | 7/2010 | Shukla et al. |
| 2010/0290396 | A1* | 11/2010 | Karunakaran et al. ........ 370/328 |
| 2011/0019550 | A1 | 1/2011 | Bryers et al. |
| 2011/0096781 | A1 | 4/2011 | Aybay |
| 2011/0103259 | A1 | 5/2011 | Aybay et al. |
| 2011/0142053 | A1* | 6/2011 | Van Der Merwe et al. ................. 370/395.1 |
| 2011/0225277 | A1* | 9/2011 | Freimuth et al. ............. 709/223 |
| 2012/0099602 | A1* | 4/2012 | Nagapudi et al. ............ 370/401 |
| 2012/0320795 | A1 | 12/2012 | Shukla et al. |

OTHER PUBLICATIONS

Office Action mailed Dec. 23, 2010 for U.S. Appl. No. 12/346,623 (19 pages).
Office Action mailed Jun. 16, 2011 for U.S. Appl. No. 12/346,623 (13 pages).
Office Action mailed Sep. 17, 2010 for U.S. Appl. No. 12/346,608 (28 pages).
Office Action mailed Apr. 14, 2011 for U.S. Appl. No. 12/346,608 (24 pages).
Final Office Action mailed Jul. 26, 2011 for U.S. Appl. No. 12/346,608 (30 pages).
Office Action mailed Jan. 17, 2012 for U.S. Appl. No. 12/346,608 (29 pages).
Office Action mailed Apr. 1, 2011 for U.S. Appl. No. 12/346,612 (19 pages).
Final Office Action mailed Dec. 5, 2011 for U.S. Appl. No. 12/346,612 (24 pages).
Office Action mailed Sep. 15, 2010 for U.S. Appl. No. 12/346,615 (21 pages).
Office Action mailed Mar. 21, 2011 for U.S. Appl. No. 12/346,615 (9 pages).
Office Action mailed Sep. 15, 2010 for U.S. Appl. No. 12/346,618 (13 pages).
Office Action mailed Apr. 7, 2011 for U.S. Appl. No. 12/346,618 (14 pages).
Office Action mailed Sep. 17, 2010 for U.S. Appl. No. 12/346,625 (24 pages).
Office Action mailed Mar. 29, 2011 for U.S. Appl. No. 12/346,625 (13 pages).
Final Office Action mailed Dec. 14, 2011 for U.S. Appl. No. 12/346,625 (14 pages).
Office Action mailed Jul. 3, 2012 for U.S. Appl. No. 12/346,625 (14 pages).
Office Action mailed Oct. 28, 2010 for U.S. Appl. No. 12/346,630 (24 pages).
Office Action mailed Apr. 27, 2011 for U.S. Appl. No. 12/346,630 (15 pages).
Final Office Action mailed Oct. 26, 2011 for U.S. Appl. No. 12/346,630 (17 pages).
Office Action mailed Oct. 5, 2010 for U.S. Appl. No. 12/346,632 (16 pages).
Office Action mailed Mar. 14, 2011 for U.S. Appl. No. 12/346,632 (21 pages).
Final Office Action mailed Aug. 15, 2011 for U.S. Appl. No. 12/346,632 (23 pages).
Office Action mailed Dec. 21, 2011 for U.S. Appl. No. 12/346,632 (27 pages).
Office Action mailed Jun. 26, 2012 for U.S. Appl. No. 12/607,162 (20 pages).
Office Action mailed Mar. 13, 2013 for U.S. Appl. No. 12/346,612, (10 pages).
Office Action mailed Dec. 26, 2012 for U.S. Appl. No. 12/346,630 (17 pages).
Office Action mailed Jan. 14, 2013 for U.S. Appl. No. 12/607,162 (19 pages).
Partial European Search Report mailed Mar. 4, 2011 for European Application No. 10187574.8 (6 pages).
Extended European Search Report mailed Aug. 17, 2011 for European Application No. 10187574.8 (10 pages).
Partial European Search Report dated Feb. 4, 2011 for European Application No. 10188736.2 (6 pages).
Extended European Search Report dated May 10, 2011 for European Application No. 10188736.2 (10 pages).

* cited by examiner

METHODS AND APPARATUS FOR TUNNEL MANAGEMENT WITHIN A DATA CENTER

BACKGROUND

Embodiments described herein relate generally to network tunneling, and, in particular, to methods and apparatus for tunnel management within a data center.

Known packet tunneling schemes can have power, chip area, processing, and/or storage requirements that may be undesirable in some applications. For example, known packet tunneling schemes often rely on relatively large, localized address databases because encapsulation of packets and tunnel origination and termination are handled at a single system (or topological layer) within a network. Accordingly, the use of these packet tunneling schemes can result in inefficiencies that may render their use in a large network of very high speed switches and routers of a data center impractical. These known packet tunneling schemes may substantially prevent scaling within, for example, a complex and large routing system such as a data center. Thus, a need exists for methods and apparatus for tunnel management within a data center.

SUMMARY

A system includes multiple edge devices and a switch fabric operatively connected to the multiple edge devices. The switch fabric and the multiple edge devices collectively define at least a portion of a core portion of a data center. An edge device from the multiple edge devices is configured to receive a physical address value included in a control plane request from a source peripheral processing device disposed outside of the core portion of the data center. The physical address value represents a destination of a packet queued at the source peripheral processing device. The edge device is configured to send, in response to the request, a tunnel value representing a physical address space including the physical address value to the source peripheral processing device.

DETAILED DESCRIPTION

Figure 1:
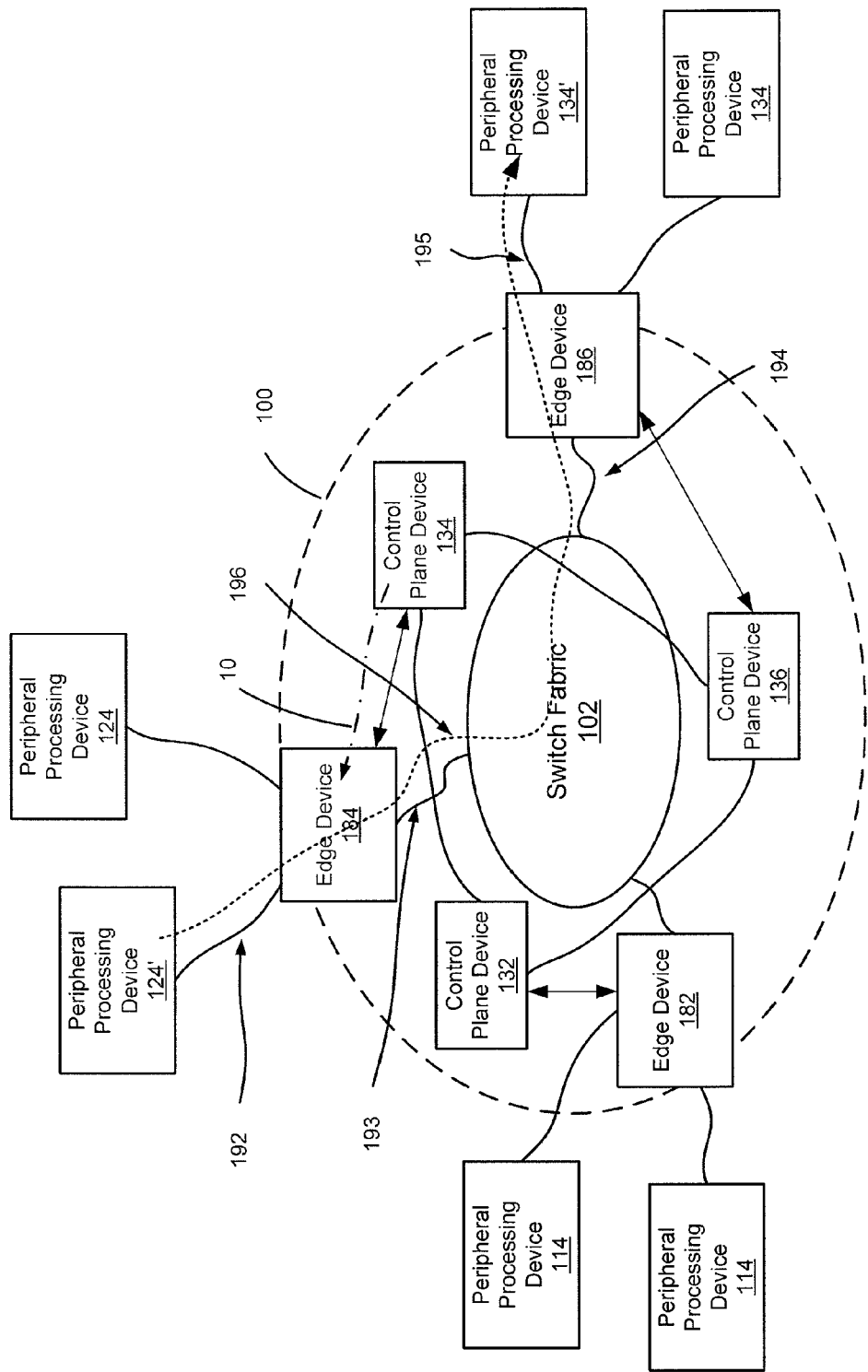
FIG. 1 is a system block diagram of a switch fabric system, according to an embodiment.

In some embodiments, a system includes multiple edge devices and a switch fabric operatively connected to the multiple edge devices. The switch fabric and the multiple edge devices collectively define at least a portion of a core portion of a data center. An edge device from the multiple edge devices is configured to receive a physical address value included in a request from a source peripheral processing device disposed outside of the core portion of the data center. The physical address value represents a destination of a packet queued at the source peripheral processing device. The edge device is configured to send, in response to the request, a tunnel value representing a physical address space including the physical address value to the source peripheral processing device.

In such embodiments, the edge device can include a tunnel database that stores an association between the physical address value and the tunnel value. In some embodiments, the edge device does not perform the tunnel origination and/or termination. Such a tunnel database, however, can be queried in response to receiving the request from the source peripheral processing device. In some embodiments, the tunnel database at a given edge device(s) includes a subset of associations maintained in a control plane device associated with the core portion of the data center. In such embodiments, the control plane device can be operatively coupled to the edge device(s) and can be configured to update and maintain the tunnel database at the edge device(s) as peripheral processing devices are operatively coupled to and decoupled from the data center. In some embodiments, the edge device can forward the request to an associated control plane device.

In some embodiments, an apparatus includes a memory of an ingress edge device, multiple ports of the ingress edge device and a tunnel module of the ingress edge device. The ingress edge device is configured to be operatively coupled to a switch fabric storing a tunnel database including multiple tunnel values stored in the memory. The multiple tunnel values include a tunnel value representing a physical address space associated with a first set of peripheral processing devices operatively connected to an egress edge device that is operatively connected to the switch fabric. Each port from the multiple ports configured to be operatively connected to a peripheral processing device from a second set of peripheral processing devices. The tunnel module is configured to receive from a source peripheral processing device from the second set of peripheral processing devices a request including an address value of a destination peripheral processing device from the first set of peripheral processing devices. The tunnel module is configured to send the tunnel value from the memory to the source peripheral processing device from the second set of peripheral processing devices via a single-hop link when the address value is included in the physical address space.

In some embodiments, a processor-readable medium stores code representing instructions to be executed by a processor. The code includes code to receive at a first peripheral processing device at least a portion of a packet including a physical address value representing at least a portion of a second peripheral processing device. The code further includes code to send to an ingress edge device of a switch fabric a request for a tunnel value representing a physical address space including the physical address value and receive the tunnel value in response to the request. Additionally, the code includes code to modify the packet based on the tunnel value such that the packet is routed through the switch fabric to an egress edge device operatively connected to the second peripheral processing device based on the tunnel value. In some embodiments, the code can be implemented on a "virtual line card" at the first peripheral processing device.

FIG. 1 is a schematic diagram that illustrates a switch fabric system 100, according to an embodiment. The switch fabric system 100 includes a switch fabric 102; multiple edge devices 182, 184, 186; and multiple control plane devices 132, 134, 136. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the edge devices 182, 184, 186. In some embodiments, the connection between the peripheral processing devices 114, 124, 134 and the edge devices 182, 184, 186 is a direct link. Such a link can be said to be a single-hop link. In other embodiments, the peripheral processing devices can be operatively coupled to the edge devices via intermediate modules. Such a connection can be said to be a multiple-hop link. In some embodiments, such intermediate modules do not use a tunnel header to forward a data packet between a peripheral processing device 114, 124, 134 and an edge device 182, 184, 186.

In some embodiments, prior to sending data packets to the edge devices 182, 184, 186, a virtual line card within each peripheral processing device 114, 124, 134 can append a tunnel header to the data packet. Such a tunnel header can include a tunnel value associated with a physical address space. In some embodiments, a tunnel value can be an identifier of a particular edge device 182, 184, 186, an identifier of a particular port or a group of ports on an edge device 182, 184, 186, an identifier associated with a group of peripheral processing devices 114, 124, 134 and/or the like. In some embodiments, a tunnel value can be a proprietary label, a multiprotocol label switching (MPLS) label, a media access control (MAC) address), an internet protocol (IP) address, and/or the like.

In some embodiments, the physical address space can be associated with an edge device 182, 184, 186 and/or a port of an edge device 182, 184, 186 to which a destination peripheral processing device 114, 124, 134 is coupled. As further described in detail herein, the tunnel value allows the switch fabric system 100 to route the data packet between peripheral processing devices 114, 124, 134 without each stage of the switch fabric 102 storing a physical address of the peripheral processing devices 114, 124, 134 (e.g., a media access control (MAC) address, an internet protocol (IP) address and/or the like) in the data path.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing device 114, 124, 134.

In some embodiments, the edge devices 182, 184, 186 can be a combination of hardware modules and software modules. In some embodiments, for example, each edge device 182, 184, 186 can be a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the encapsulation of a data packet (e.g., modify, add and/or remove a header portion, footer portion and/or any other identifier included within the data packet) prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some embodiments, each edge device 182, 184, 186 can store and maintain a tunnel database. As described in further detail herein, the tunnel databases can store information representing a topology of the switch fabric system 100. Such information representing a topology of the switch fabric system 100 can include, for example, which edge devices 182, 184, 186 and/or which ports of edge devices 182, 184, 186 are coupled to which peripheral processing devices 114, 124, 134. Accordingly, the tunnel database can associate a physical identifier of a peripheral processing device (e.g., a media access control (MAC) address, an interne protocol (IP) address and/or the like) with an identifier of an edge device and/or an identifier of a port of an edge device (e.g., a tunnel value). In some embodiments, for example, each peripheral processing device (e.g., 114) coupled to a given edge device (e.g., 182) is associated with a common tunnel value. In such embodiments, each edge device (e.g., 182) can be said to define a physical address space. In other embodiments, each peripheral processing device within a first set of peripheral processing devices coupled to that edge device is associated with a first tunnel value and each peripheral processing device within a second set of peripheral processing devices coupled to the edge device is associated with a second tunnel value, different from the first tunnel value. In such embodiments, the first set of peripheral processing devices and the second set of peripheral processing devices can be said to define or be a associated with a first physical address space and a second physical address space, respectively. In some embodiments, when an edge device 182, 184, 186 receives a packet having a tunnel value associated with one of that edge device's 182, 184, 186 physical address spaces, the edge device 182, 184, 186 can perform another lookup to determine to which peripheral processing device 114, 124, 134 to send the packet.

As discussed above, and as described in further detail herein, a source edge device can send a tunnel value associated with a physical address space of a destination edge device to a source peripheral processing device. In some embodiments, the tunnel value can be sent from the source edge device to the source peripheral processing device via an in-band signaling channel (e.g., the signaling channel through which the peripheral processing device sends data to and receives data from the edge device). In other embodiments, the tunnel value can be sent from the source edge device to the source peripheral processing device via a dedicated out-of-band signaling channel. The source peripheral processing device can append a tunnel header including the tunnel value to a data packet to be sent to a destination peripheral processing device coupled to the destination edge device.

The information within the tunnel database can be received by the edge devices 182, 184, 186 from a control plane device 132, 134, 136. Similarly, updates to the topology of the switch fabric system 100 can be received by the edge devices 182, 184, 186 via the control plane devices 132, 134, 136. In some embodiments, each edge device 182, 184, 186 receives topology information associated with all other edge devices 182, 184, 186 within the switch fabric system 100. In other embodiments, each edge device 182, 184, 186 receives topology information associated with the remaining edge devices within the switch fabric with which each edge device is concerned. In such embodiments, a network preference can determine with which remaining edge devices a particular edge device is concerned. For example, a first set of edge devices can be part of a first virtual local area network (VLAN) and a second set of edge devices can be part of a second VLAN. As such, the first set of edge devices do not send data packets to the second set of edge devices. Thus, each edge device from the first set of edge devices receives only the topology information associated with the remaining edge devices from the first set of edge devices and the peripheral processing devices operatively coupled to the first set of edge devices. Similarly, each edge device from the second set of edge devices receives only the topology information associated with the remaining edge devices from the second set of edge devices and the peripheral processing devices operatively coupled to the second set of edge devices. In some embodiments, a network administrator can determine with which remaining edge devices a particular edge device is concerned.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data.

The edge devices 182, 184, 186 can include one or more network interface devices (e.g., a network interface card (NIC), a 10 Gigabit (Gb) Ethernet Converged Network Adapter (CNA) device) through which the edge devices 182, 184, 186 can send signals to and/or receive signals from the switch fabric 102. The signals can be sent to and/or received from the switch fabric 102 via a physical link and/or a wireless link operatively coupled to the edge devices 182, 184, 186. In some embodiments, the edge devices 182, 184, 186 can be configured to send to and/or receive signals from the switch fabric 102 based on one or more protocols (e.g., an Ethernet protocol, a multi-protocol label switching (MPLS) protocol, a fibre channel protocol, a fibre-channel-over Ethernet protocol, an Infiniband-related protocol).

In some embodiments, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can define a core portion of a data center.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). The switch fabric 102 can be configured to connect (e.g., facilitate communication between) the peripheral processing devices 114, 124, 134. In some embodiments, the switch fabric 102 can be configured to communicate via interface devices configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch. More details related to architecture of the switch fabric 102 are described herein.

Each control plane device 132, 134, 136 can be any device configured to discover, update and maintain a topology of the switch fabric system 100. In some embodiments, for example, the control plane devices 132, 134, 136 can run topology discovery protocols to discover the topology of the switch fabric. As such, the control plane can be similar to the control plane shown and described in U.S. patent application Ser. No. 12/345,498, filed Dec. 29, 2008, and entitled "Control Plane Architecture for Switch fabrics," and the control plane in U.S. Patent Application No. 61/316,720, filed Mar. 23, 2010, entitled "Methods and Apparatus Related to Distributed Control Plane Switch Management," the disclosures of which are incorporated herein by reference in their entirety. While shown in FIG. 1 has having multiple control plane devices 132, 134, 136, in other embodiments, the switch fabric system includes a single central control plane device.

In some embodiments, the control plane devices 132, 134, 136 can receive topology information from the edge devices 182, 184, 186 and aggregate the information into a database. Such information can include, for example, the physical addresses (e.g., MAC addresses, IP addresses and/or the like) of the peripheral processing devices 114, 124, 134 and an identifier of the edge devices 182, 184, 186 to which each peripheral processing device 114, 124, 134 is coupled. Using this information, the control plane devices 132, 134, 136 can associate the physical address of each peripheral processing device 114, 124, 134 with a tunnel value associated with a physical address space (e.g., the edge device 182, 184, 186 and/or the port of the edge device to which each peripheral processing device 114, 124, 134 is coupled). For example, the control plane devices 132, 134, 136 can associate the peripheral processing devices 114 with a tunnel value associated with the edge device 182, the peripheral processing devices 124 with a tunnel value associated with the edge device 184 and the peripheral processing devices 134 with a tunnel value associated with the edge device 186.

At least one control plane device 132, 134, 136 can send the aggregated topology information to each edge device 182, 184, 186 such that the edge devices 182, 184, 186 can populate and maintain the tunnel databases. Similarly stated, each edge device 182, 184, 186 can receive the aggregated topology information from at least one control plane device 132, 134, 136. As discussed above, in some embodiments, the control plane devices 132, 134, 136 send the entire topology of the switch fabric system 100 (including the topology information of each peripheral processing device 114, 124, 134 operatively coupled to the switch fabric system 100) to each edge device 182, 184, 186. In other embodiments, the control plane devices 132, 134, 136 only send the topology information with which each edge device 182, 184, 186 is concerned (e.g., the topology information associated with particular VLANs).

In use, a data packet (e.g., an Ethernet packet) can be sent between peripheral processing devices 114, 124, 134 via the switch fabric system 100. For example, a data packet can be sent from a first peripheral processing device 124' to a second peripheral processing device 134' via path 196. The first peripheral processing device 124' can determine a physical address of the second peripheral processing device 134' to which the data packet is to be sent by, for example, parsing a header portion of the data packet. Using the physical address of the second peripheral processing device 134', the first peripheral processing device 124' can request a tunnel value associated with the second peripheral processing device 134' from the edge device 184. Similarly stated, the first peripheral processing device 124' can send a signal to the edge device 184 requesting the tunnel value associated with the physical address of the second peripheral processing device 134'.

The edge device 184 receives the request from the first peripheral processing device 124' and queries a tunnel database for a tunnel value associated with the physical address of the second peripheral processing device 134'. As described above, the information within the tunnel database is received from and maintained based on updates received from the control plane device 134, via path 10.

After the edge device 184 retrieves the tunnel value, the edge device 184 sends the tunnel value to the peripheral processing device 124'. The peripheral processing device 124' can then append the tunnel value to the data packet as a tunnel header. Similarly stated, the peripheral processing device 124' can modify the data packet to include a tunnel header associated with the tunnel value.

The first peripheral processing device 124' can send the data packet to the edge device 184 via link 192. Using the tunnel value within the tunnel header, the edge device 184 can determine to which switching module associated with the first stage of the switch fabric 102 to send the data packet. Any suitable method can be used to determine to which switching module to send the data packet. In some embodiments, for example, a routing table and/or a hash function using the tunnel value as an input can be used to determine to which switching module to send the data packet. In some embodiments, for example, the hash function can be similar to the hash functions shown and described in U.S. patent application Ser. No. 12/242,158, filed on Sep. 30, 2008, and entitled "Methods and Apparatus for Producing a Hash Value based on a Hash Function," which is incorporated herein by reference in its entirety.

The edge device 184 can send the data packet to the switch fabric 102 via link 193. The switching modules within the switch fabric 102 route the data packet through the switch fabric 102 using the tunnel value within the tunnel header. The switching modules can use any suitable method to determine to which switching module associated with the next stage of the switch fabric or to which edge device to send the data packet. In some embodiments, for example, a routing table and/or a hash function using the tunnel value as an input can be used to determine to which switching module or edge device to send the data packet.

The switch fabric 102 can send the data packet to the edge device 186 associated with the tunnel value via link 194. The edge device 186 can parse the data packet to retrieve the physical address (e.g., MAC address) of the second peripheral processing device 134'. Using the physical address of the second peripheral processing device 134', the edge device 186 can send the data packet to the peripheral processing device 134' via link 195. In other embodiments, the tunnel value appended to the data packet by the first peripheral processing device 124' is associated with the second peripheral processing device 134' and/or the link 195. In such embodiments, the edge device 186 can forward the data packet to the second peripheral processing device 134' without using the physical address of the second peripheral processing device 134'.

Figure 2:
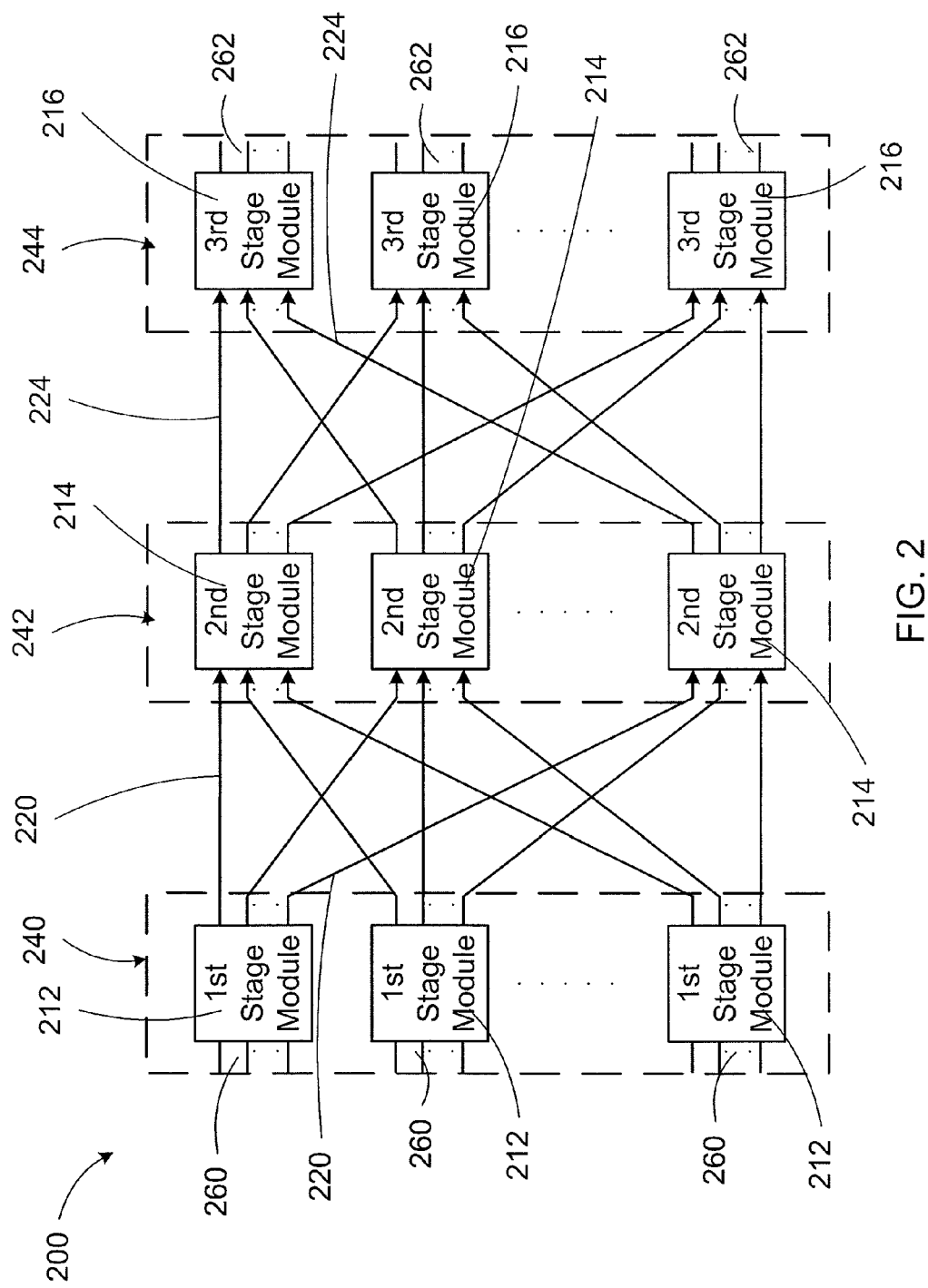
FIG. 2 is a schematic illustration of a switch fabric, according to another embodiment.

FIG. 2 is a schematic illustration of a switch fabric 200, according to an embodiment. The switch fabric 200 can define a core portion of a data center. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

Figure 3A:
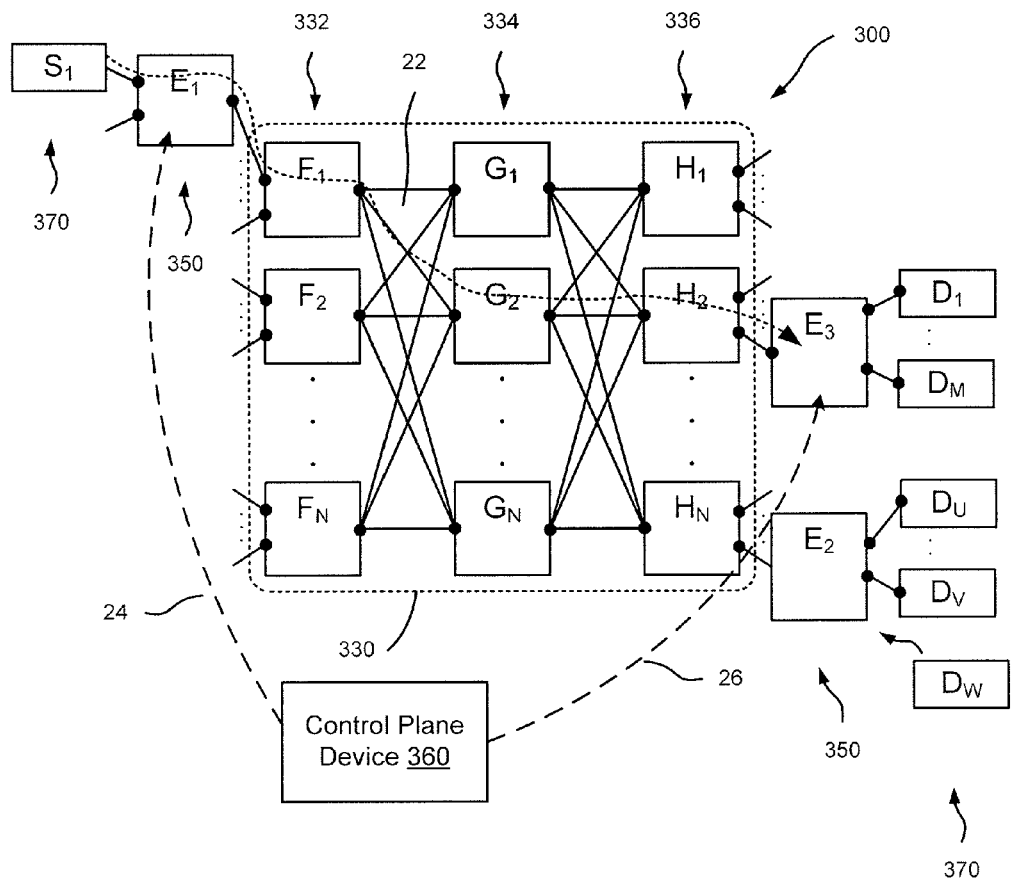
FIG. 3A is a system block diagram of a switch fabric system, according to another embodiment.

FIG. 3A is a schematic illustration of a switch fabric system 300, according to another embodiment. The switch fabric system 300 includes a switch fabric 330, multiple edge devices 350 operatively coupled to the switch fabric 330 and a control plane device 360. Multiple peripheral processing devices 370 are operatively coupled to the edge devices 350 of the switch fabric system 300. As described in further detail herein, a first peripheral processing device 370 (e.g., $S_1$) is configured to send a data packet to a second peripheral processing device 370 (e.g., $D_1$) via a first edge device 350 (e.g., $E_1$), the switch fabric 330, and a second edge device 350 (e.g., $E_3$).

The switch fabric 330 can be structurally and functionally similar to the switch fabric 200. Accordingly, the switch fabric includes modules $F_1$-$F_N$ associated with a first stage 332 of the switch fabric 330, modules $G_1$-$G_N$ associated with a second stage 334 of the switch fabric 330, and modules $H_1$-$H_N$ associated with a third stage 336 of the switch fabric. Each module $F_1$-$F_N$ associated with the first stage 332 is operatively coupled to each module $G_1$-$G_N$ associated with the second stage 334 via data paths. Similarly, each module $G_1$-$G_N$ associated with the second stage 334 is operatively coupled to each module $H_1$-$H_N$ associated with the third stage 336. The data paths between the modules $F_1$-$F_N$ associated with the first stage 332 and the modules $G_1$-$G_N$ associated with the second stage 334 and/or the data paths between the modules $G_1$-$G_N$ associated with the second stage 334 and the modules $H_1$-$H_N$ associated with the third stage 336 can be constructed in any manner configured to facilitate data transfer. In some embodiments, for example, the data paths include optical connectors, optical fibers and/or electrical connectors between the modules. In some embodiments, the data paths are within a midplane or a backplane.

The peripheral processing devices 370 can be, for example, compute nodes, service nodes, routers, and storage nodes, as described in further detail herein. In some embodiments, for example, the peripheral processing devices 370 include servers, storage devices, gateways, workstations, and/or the like. The peripheral processing devices 370 can be operatively coupled to the edge devices 350 using any suitable connection such as, for example, a backplane or a midplane of a chassis, an optical connection (e.g., an optical cable and optical connectors), an electrical connection (e.g., an electrical cable and electrical connectors) and/or the like. As such, the peripheral processing devices 370 are configured to send data (e.g., data packets, data cells, etc.) to and receive data from the edge devices 350. In some embodiments, the connection between the peripheral processing devices 370 and the edge devices 350 is a direct link. Such a link can be said to be a single-hop link. In other embodiments, the peripheral processing devices can be operatively coupled to the edge devices via intermediate modules. Such a connection can be said to be a multiple-hop link.

In some embodiments, prior to sending data packets to the edge devices 350, a virtual line card of the peripheral processing devices 370 can request a tunnel value from an edge device 350 and append the tunnel value in a tunnel header to the data packet. Such a virtual line card can be implemented in software (executing in a processor) or hardware on the peripheral processing devices 370. In some embodiments, the virtual line card can be installed on any peripheral processing device 370.

Figure 3B:
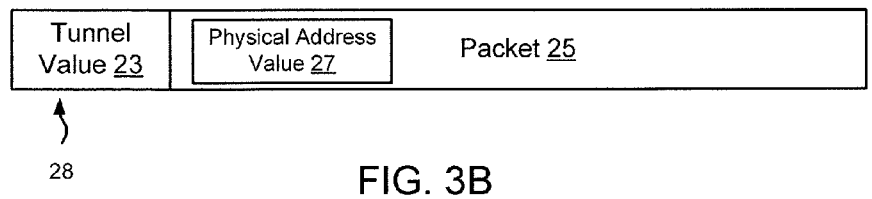
FIG. 3B is a schematic illustration of a data packet, according to an embodiment.

FIG. 3B illustrates a modified data packet 29 including a tunnel header 28 appended to a data packet 25. Such a tunnel header 28 can include a tunnel value 23 associated with a physical address space. In some embodiments, a tunnel value can be an identifier of a particular edge device 350, an identifier of a particular port or group of ports on an edge device 350, an identifier associated with a group of peripheral processing devices 370 and/or the like.

The physical address space can be represented by values such as a physical address value 27 included in the data packet 25. The physical address value 27 is associated with a destination peripheral processing device (e.g., $D_1$) to which the modified data packet 29 is to be sent. In some embodiments, the physical address value 27 can be a media access control (MAC) address of the destination peripheral processing device, an internet protocol (IP) address of the destination peripheral processing device and/or the like. In some embodiments, the physical address value 27 can be mapped to a tunnel value 23 associated with a physical address space, as described in further detail herein.

In some embodiments, the physical address space can be associated with an edge device 350 and/or a port of an edge device 350 to which a destination peripheral processing device 370 is coupled. As further described in detail herein, the tunnel value 23 allows the switch fabric system 300 to route the modified data packet 29 between peripheral processing devices 370 without each stage of the switch fabric 330 storing the physical address value 27. In some embodiments, the tunnel value 23 can be an address value associated with the physical address space for the tunnel, such as, for example, an MPLS label. In other embodiments, the tunnel value 23 can be associated with a prefix address space for the tunnel, such as, for example, an IP address.

The edge devices 350 can be any devices configured to operatively couple peripheral processing devices 370 to the switch fabric 330. In some embodiments, for example, the edge devices 350 can be access switches, input/output modules, top-of-rack devices and/or the like. Edge device $E_1$ is schematically shown as a source edge device and edge devices $E_2$ and $E_3$ are schematically shown as destination edge devices for illustration purposes only. Structurally, the edge devices 350 (including $E_1$, $E_2$, and $E_3$) can function as source edge devices and destination edge devices. Accordingly, the edge devices 350 can send data to and receive data from the switch fabric 330.

While shown in FIG. 3A as being operatively coupled to a single module $F_1$ associated with the first stage 332, the edge device $E_1$ can be coupled to any number of modules associated with the first stage 332. Additionally, while shown in FIG. 3 as being operatively coupled to a single switch fabric 330, the edge device $E_1$ can be operatively coupled to any number of switch fabrics, similar to switch fabric 330. In some embodiments, for example, the edge device $E_1$ can be both coupled to the module $F_1$ associated with the first stage of the switch fabric 330 and a module associated with a first stage of a second switch fabric (not shown in FIG. 3). In such embodiments, the edge device $E_1$ can send data to either the module $F_1$ or the module associated with the first stage of the second switch fabric.

Figure 3C:
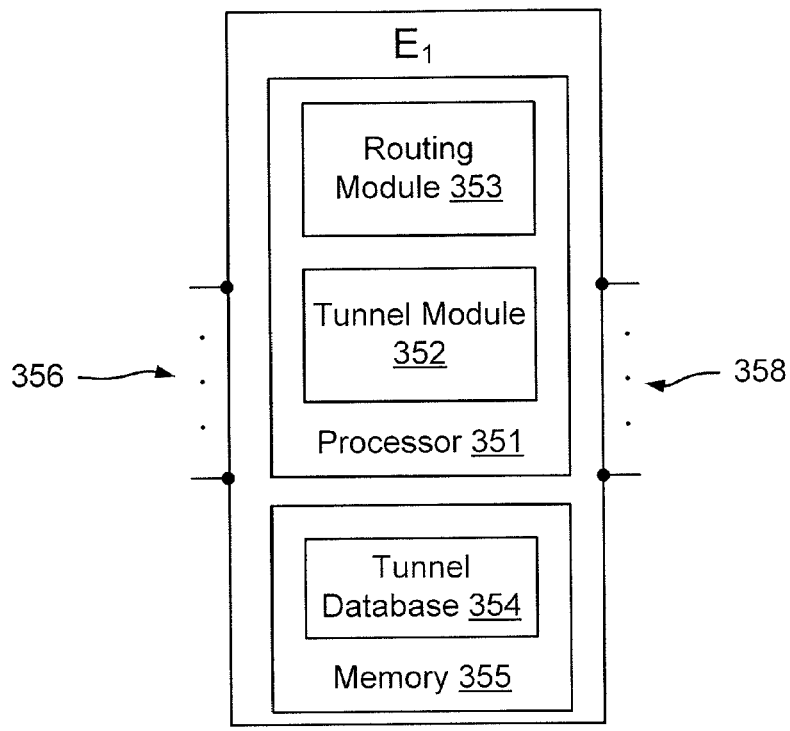
FIG. 3C is a schematic illustration of an edge device from the switch fabric system shown in FIG. 3A.

FIG. 3C is a schematic illustration of the edge device $E_1$ of the switch fabric system 300. The edge device $E_1$ includes ports 356, ports 358, a processor 351 including a routing module 353 and a tunnel module 352, and a memory 355 including a tunnel database 354. In some embodiments, the processor 351 and the memory 355 are part of a single ASIC, FPGA or DSP. Ports 356 can be any ports suitable to receive data packets from and send data packets to a peripheral processing device 370. Similarly, ports 358 can be any ports suitable to send data packets to and receive data packets from a switch fabric 330. Both ports 356 and ports 358 can be referred to as ports or network ports.

The routing module 353 can be configured to prepare a data packet (or a modified data packet) to enter the switch fabric 330. For example, the routing module 353 can be configured to forward, classify, and/or modify the packet encapsulation of a data packet prior to sending the data packet to the switch fabric 330. In some embodiments, the routing module 353 can determine to which switching module associated with the first stage 332 of the switch fabric 330 to send a data packet. Such a determination can be based on a tunnel value, as described in further detail herein.

The tunnel module 352 can be configured to receive requests from peripheral processing devices 370 for tunnel values associated with physical address values, query the tunnel database 354 for the tunnel values, and return the requested tunnel values to the peripheral processing devices 370, as further described herein. Additionally, the tunnel module 352 can be configured to update and maintain the tunnel database 354. For example, the tunnel module 352 can receive signals from the control plane device 360 indicating that a peripheral processing device 370 has been operatively coupled to edge device $E_1$ and/or a peripheral processing device 370 has been operatively decoupled from edge device $E_1$. As described in further detail herein, the tunnel module 352 can update the tunnel database 354 accordingly.

Figure 3D:
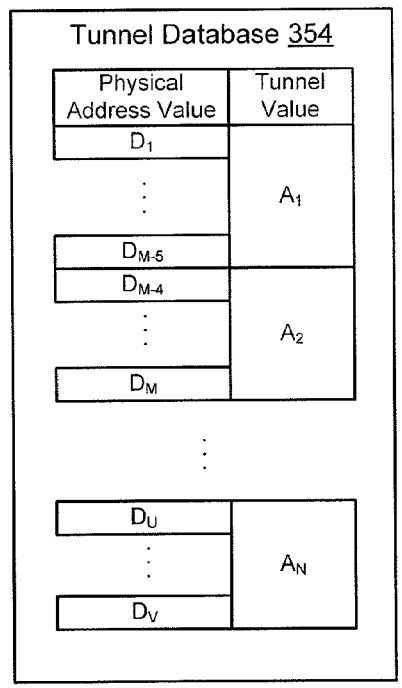
FIG. 3D is a schematic illustration of a tunnel database on the edge device shown in FIG. 3C.

The tunnel database 354 can store the associations between tunnel values associated with physical address spaces and the physical address values of the peripheral processing devices 370. For example, FIG. 3D is an illustration of the tunnel database 354. The tunnel database 354 stores tunnel values $A_1$-$A_N$ along with the physical address values $D_1$-$D_V$ of the peripheral processing devices 370 with which the edge device $E_1$ is concerned. As described above, in some embodiments such peripheral processing devices can be a subset of the peripheral processing devices 370 coupled to the switch fabric system 300 (e.g., $D_1$-$D_V$). The subset can be, for example, those peripheral processing devices 370 associated with a network domain (e.g., a particular VLAN or layer 3 (L3) virtual private network (VPN)). In other embodiments, the peripheral processing devices with which the edge device $E_1$ is concerned can include every peripheral processing device 370 coupled to the switch fabric system 300.

Each physical address value $D_1$-$D_V$ is associated with a tunnel value $A_1$-$A_N$. Similarly stated, each physical address value $D_1$-$D_V$ is mapped to a tunnel value $A_1$-$A_N$. For example, the physical address values $D_1$-$D_{M-5}$ are mapped to the tunnel value $A_1$, the physical address values $D_{M-4}$-$D_M$ are mapped to the tunnel value $A_2$ and the physical address values $D_U$-$D_V$ are mapped to the tunnel value $A_3$. As discussed above, the tunnel value $A_1$-$A_N$ with which each physical address value $D_1$-$D_V$ is associated corresponds to or represents the physical address space with which a peripheral processing device 370 identified by a physical address value $D_1$-$D_V$ is associated. The physical address space associated with or represented by a tunnel value $A_1$-$A_N$ includes every peripheral processing device 370 coupled to an edge device 350 and/or a subset of the peripheral processing devices 370 coupled to an edge device 350. For example, the physical address space associated with a tunnel value $A_N$ includes every peripheral processing device $D_U$-$D_V$ coupled to the edge device $E_2$ (see FIG. 3A). For another example, the physical address space associated with a tunnel value $A_1$ includes a first subset $D_1$-$D_{M-5}$ of the peripheral processing devices $D_1$-$D_M$ coupled to the edge device $E_3$ and the physical address space associated with a tunnel value $A_2$ includes a second subset $D_{M-4}$-$D_M$ of the peripheral processing devices $D_1$-$D_M$ coupled to the edge device $E_3$.

Referring again to FIG. 3A, the control plane device 360 can be a combination of hardware modules and software modules configured to manage the resources within the switch fabric system 300. In some embodiments, for example, the control plane device 360 can be a general purpose central processing unit (CPU), a field-programmable gate array (FPGA), an application specific integrated circuit (ASIC), a digital signal processor (DSP) and/or the like.

The control plane device 360 can be similar to the control plane devices 132, 134, 136 shown and described above. As such, the control plane device 360 can be configured to discover, update and maintain topology information of the switch fabric system 300. In some embodiments, for example, the control plane device 360 can run topology discovery protocols to discover the topology of the switch fabric system 300.

In some embodiments, the control plane device 360 can receive topology information from the edge devices 350 and aggregate the topology information into a database. The topology information received from the edge devices 350 can include, for example, the physical address values (e.g., MAC addresses, IP addresses and/or the like) of the peripheral processing devices 370, a value associated with the edge devices to which the peripheral processing devices are coupled, a value associated with the ports of the edge devices to which the peripheral processing devices are coupled and/or the like. Using this information, the control plane device 360 can associate the physical address value of each peripheral processing device 370 with a tunnel value associated with a physical address space. For example, the control plane device 360 can associate the peripheral processing devices having the physical address values $D_1$-$D_{M-5}$ with a tunnel value $A_1$, the peripheral processing devices having the physical address values $D_{M-4}$-$D_M$ with a tunnel value $A_2$ and the peripheral processing devices having the physical address values $D_U$-$D_V$ with a tunnel value $A_N$.

The database of the control plane device 360 can be similar to the tunnel database 354 shown an described with respect to FIG. 3D. Accordingly, the database stores the tunnel values and their associated physical address values. In some embodiments, the database of the control plane device 360 can maintain the mappings of the tunnel values and their associated physical address values for the entire switch fabric system 300. The control plane device 360 also updates and/or maintains the associations within the database as peripheral processing devices 370 are operatively coupled to and/or operatively decoupled from the edge devices 350 of the switch fabric system 300.

The control plane device 360 can send the topology information to the edge devices 350 such that each edge device 350 can populate and maintain a local copy of the tunnel database (e.g., FIG. 3D). As discussed above, in some embodiments, the control plane device 360 sends the topology information of the switch fabric system 300 in its entirety to each edge device 350. In other embodiments, the control plane device 360 only sends the topology information with which each edge device 370 is concerned (e.g., the topology information associated with particular VLANs).

In some embodiments, the control plane device 360 is operatively coupled to the edge devices 350 via a direct connection. Similarly stated, the control plane device 360 can communicate with the edge devices 350 without sending signals through other modules within the switch fabric system 300. As such, the control plane device 360 can communicate with the edge devices 350 via a communication channel out-of-band from the communication channels of the switch fabric 330. In such embodiments, the control plane device 360 sends topology information to the edge devices via the direct connection. In other embodiments, the control plane device 360 is operatively coupled to the edge devices 350 via other modules within the switch fabric system 300. In such embodiments, for example, the control plane device 360 sends topology information to the edge devices using the existing connections of the switch fabric system 300. For example, the control plane device 360 can send topology information to edge device $E_1$ via the connection between edge device $E_1$ and module $F_1$. In such embodiments, the control plane device 360 can be said to send the topological information to the edge device $E_1$ via an in-band connection.

In use, a control plane device 360 can run a topology discovery protocol to discover the topology of the switch fabric system 300. Specifically, the control plane device 360 can discover how each edge device 350 is coupled to the switch fabric 330. Using a tunnel information dissemination protocol, the control plane device 360 can also discover which peripheral processing devices 370 are coupled to which edge devices 350. Using the information discovered from the topology discovery protocol and the tunnel information dissemination protocol, the control plane device 360 can associate the physical address values of the peripheral processing devices 370 with tunnel physical address spaces according to which edge device 350 and/or which port of the edge device 350 the peripheral processing devices 370 are coupled and store such associations in a database. In other embodiments, the edge devices can send information associated with the peripheral processing devices to the control plane device 360 in addition to and/or instead of the control plane device 360 running a topology discovery protocol.

After the control plane device 360 associates the physical address values of the peripheral processing devices 370 with physical address spaces, the control plane device 360 sends this information to the edge devices 350. Each edge device 350 can use this information to define a tunnel database similar to the tunnel database 354 (FIG. 3D). As described in further detail herein, the tunnel databases can be used in routing a data packet between two peripheral processing devices 370.

The control plane device 360 can update its local tunnel database when a peripheral processing device is first operatively coupled to an edge device 350 of the switch fabric system 330 or when a peripheral processing device is operatively decoupled from an edge device 350 of the switch fabric system 330. For example, FIG. 3A illustrates the peripheral processing device $D_W$ being coupled to the edge device $E_2$. After the peripheral processing device $D_W$ is physically coupled to the edge device $E_2$, the edge device $E_2$ can send an update signal associated with the peripheral processing device $D_W$ to the control plane device 360. Based on the information within the update signal, the control plane device 360 associates the physical address of the peripheral processing device $D_W$ with a physical address space associated with edge device $E_2$ and updates the database accordingly. The control plane device 360 can then send the updated information to the appropriate edge devices 350. Each edge device 350 that receives the updated information can update their tunnel database accordingly. A similar process can be used to remove a peripheral processing device from the tunnel databases when a peripheral processing device is decoupled from an edge device 350. In embodiments having multiple control plane devices 360, the control plane devices 360 can share updated information and send the updated information to their associated edge devices 350.

FIG. 3A illustrates the peripheral processing device $S_1$ sending a data packet to peripheral processing device $D_1$ by way of example. Any peripheral processing device 370 operatively coupled to the switch fabric 330 via an edge device 350 can be configured to send a data packet to any other peripheral processing device 370 coupled to the switch fabric 330 via an edge device 350.

The peripheral processing device $S_1$ can determine a physical address of the peripheral processing device $D_1$ to which the data packet is to be sent by, for example, parsing a destination address portion of the data packet 25 having a physical address value 27 (e.g., FIG. 3B). Using the physical address value 27 of the peripheral processing device $D_1$, the peripheral processing device $S_1$ can request a tunnel value associated with the peripheral processing device $D_1$ from the edge device $E_1$ if the peripheral processing device D1 does not already have the associated tunnel value. Similarly stated, the peripheral processing device $S_1$ can send a signal to the edge device $E_1$ requesting the tunnel value associated with the physical address of the peripheral processing device $D_1$.

The tunnel module 352 of the edge device $E_1$ receives the request from the peripheral processing device $S_1$ and queries the tunnel database 354 (FIG. 3D) for a tunnel value associated with the physical address value 27 of the peripheral processing device $D_1$. As shown in FIG. 3D, the physical address value of the peripheral processing device $D_1$ is associated with tunnel value $A_1$.

After the edge device $E_1$ retrieves the tunnel value $A_1$, the edge device $E_1$ sends the tunnel value to the peripheral processing device $S_1$. The peripheral processing device $S_1$ can then append the tunnel value 23 to the data packet 25 as a tunnel header 28 to define a modified data packet 29 (FIG. 3B). Similarly stated, the peripheral processing device $S_1$ can modify the data packet 25 to include a tunnel header 28 associated with the tunnel value 23. In some embodiments, peripheral processing device $S_1$ can age out the association of peripheral processing device $D_1$ with the tunnel value $A_1$ after a predetermined period of time and/or using an aging algorithm.

The peripheral processing device $S_1$ can send the modified data packet 29 to the edge device $E_1$. Using the tunnel value 23 within the tunnel header 28, the edge device $E_1$ can determine to which switching module $F_1$ associated with the first stage 332 of the switch fabric 330 to send the modified data packet 29. Any suitable method can be used to determine to which switching module $F_1$ to send the modified data packet 29. In some embodiments, for example, a routing table and/or a hash function using the tunnel value 23 as an input to determine to which switching module $F_1$ to send the modified data packet 29 can be used.

After the module $F_1$ associated with the first stage 332 receives the modified data packet 29, it determines to which module $G_2$ associated with the second stage 334 to send the modified data packet 29. In some embodiments, for example, the module $F_1$ can use a hash function using as an input the tunnel value 23. Based on the inputs, the hash function can generate an identifier associated with a module (e.g., module $G_2$) associated with the second stage 334, and send the modified data packet 29 accordingly. In other embodiments, a lookup table can be used.

After the module $G_2$ associated with the second stage 334 receives the modified data packet 29, it determines to which module $H_2$ associated with the third stage 336 to send the modified data packet 29, using the tunnel value 23 similar to the module $F_1$. Similarly, after the module $H_2$ associated with the third stage 336 receives the modified data packet 29, it determines to which edge device $E_3$ to send the modified data packet 29 using the tunnel value 23.

After the edge device $E_3$ receives the modified data packet 29, the edge device $E_3$ can parse the data packet 25 to retrieve the physical address value 27 (e.g., MAC address) of the peripheral processing device $D_1$. Using the physical address of the peripheral processing device $D_1$, the edge device $E_3$ can send the data packet 25 to the peripheral processing device $D_1$. In other embodiments, the tunnel value 23 is associated with the peripheral processing device $D_1$. In such embodiments, the edge device $E_3$ can send the data packet to the peripheral processing device $D_1$ based on the tunnel value 23. In some embodiments, the edge device $E_3$ removes the tunnel header 28 from the modified data packet 29 and sends the data packet 25 to the peripheral processing device $D_1$ without the tunnel header 28.

Figure 4:
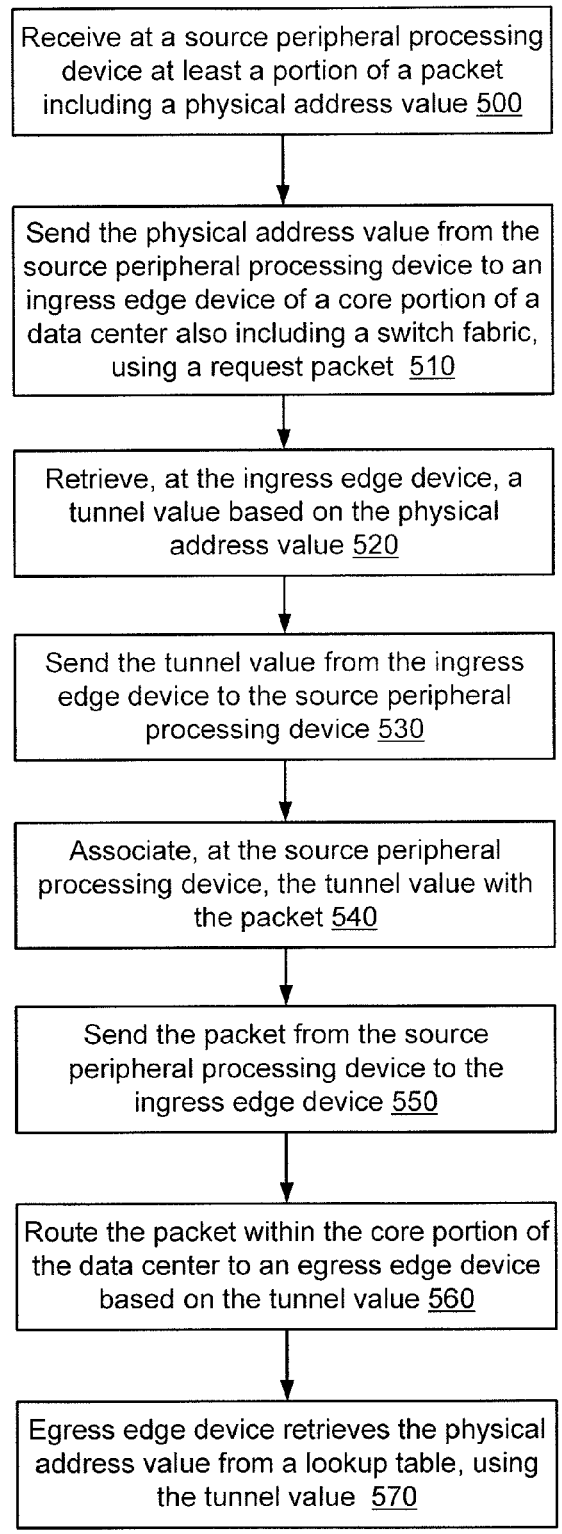
FIG. 4 is a flowchart that illustrates a method of sending a data packet from a source peripheral processing device to a destination peripheral processing device, according to another embodiment.

FIG. 4 is a flowchart that illustrates a method of sending a data packet from a source peripheral processing device to a destination peripheral processing device, according to another embodiment. The method includes receiving at a source peripheral processing device at least a portion of a packet including a physical address value, at 500. The physical address value can be associated with a destination peripheral processing device to which the packet is to be sent via a core portion of a data center.

The physical address value is sent from the source peripheral processing device to an ingress edge device of a core portion of a data center also including a switch fabric, at 510. The physical address value can be sent via an in-band link between the source peripheral processing device and the ingress edge device (e.g., a link over which the peripheral processing device can send data packets to the ingress edge device). In other embodiments, the physical address value can be sent via a dedicated out-of-band link. The processing device can be coupled to the switch fabric via the ingress edge device. The ingress edge device can include a tunnel module to receive the physical address value.

A tunnel value is retrieved based on the physical address value, at 520. The tunnel value can be associated with a physical address space associated with the physical address value. The physical address space can be associated with an egress edge device and/or a portion of an egress edge device (e.g., a port) to which the destination peripheral processing device is coupled. The tunnel value can be associated with the physical address value in a tunnel table maintained by the tunnel module of the ingress edge device.

The tunnel value is sent from the ingress edge device to the source peripheral processing device, at 530. In some embodiments, the tunnel value can be sent via the in-band link. In other embodiments, the tunnel value can be sent via a dedicated out-of-band link.

The tunnel value is associated with the packet, at 540. The source peripheral processing device can associate the tunnel value with the packet by appending a tunnel header to the packet. The tunnel header can include the tunnel value. After the tunnel header is appended to the packet, the packet is ready to be sent to the ingress edge device.

The packet is sent from the source peripheral processing device to the ingress edge device, at 550. The ingress edge device prepares the packet to enter the switch fabric and sends the packet to the switch fabric. The ingress edge device can determine to which module within the switch fabric to send the packet using the tunnel value.

The packet is routed within the core portion of the data center to an egress edge device based on the tunnel value, at 560. In some embodiments, the packet can be routed between the modules within the core portion of the data center using a hash function and/or a lookup table with the tunnel value as an input.

The egress edge device can then retrieve the physical address value from a lookup table, using the tunnel value, at 570. The packet can then be sent to the destination peripheral processing device based on the physical address value associated with the packet. In other embodiments, the tunnel value can be associated with the destination peripheral processing device. In such embodiments, the packet can be sent directly to the destination peripheral processing device based on the tunnel value and without querying the lookup table for the physical address value.

Figure 5:
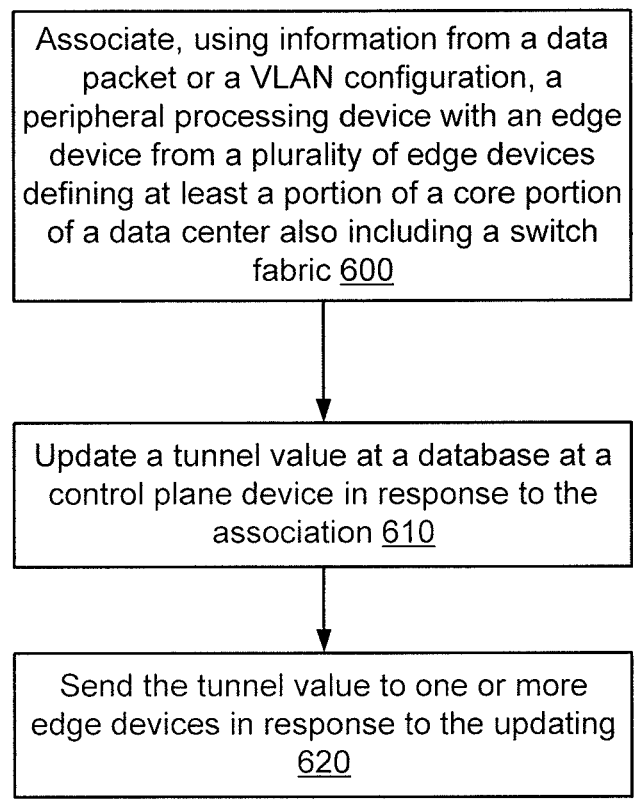
FIG. 5 is a flowchart that illustrates a method of maintaining a database associated with a topology of a switch fabric system, according to another embodiment.

FIG. 5 is a flowchart that illustrates a method of maintaining a database associated with a topology of a switch fabric system, according to another embodiment. The method includes associating, using information from a data packet or a VLAN configuration, a peripheral processing device with an edge device from a plurality of edge devices defining at least a portion of a core portion of a data center also including a switch fabric, at 600. The peripheral processing device can be associated with the edge device by operatively coupling the peripheral processing device to the edge device via a data link.

A tunnel value is updated at a database at a control plane device in response to the association, at 610. In some embodiments, the control plane device can run a topology discovery protocol to determine that the peripheral processing device has been associated with the edge device. In other embodiments, the edge device can send a signal to the control plane device indicating that the peripheral processing device has been associated with the edge device. In some embodiments, the edge device can discover the association with the peripheral processing device when the peripheral processing device sends a data packet to the edge device. The tunnel value can be updated such that a physical address value associated with the peripheral processing device is associated in a database with the tunnel value. In some embodiments, the tunnel value associates the peripheral processing device with a physical address space.

The tunnel value is sent to one or more edge devices in response to the updating, at 620. The edge devices can update tunnel databases stored at the edge devices in response to receiving the tunnel value.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as being a three-stage switch fabric, in other embodiments, the switch fabric can include any number of stages. In some embodiments, for example, the switch fabric can be a five stage switch fabric similar to the switch fabric shown and described in U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety.

While the peripheral processing devices are shown and described above as requesting a tunnel value from an edge device each time the peripheral processing device prepares to send a data packet to a switch fabric system, in some embodiments, the peripheral processing devices can maintain a tunnel database. In such embodiments, the tunnel database of a peripheral processing device can be a subset of the tunnel database at the edge device to which it is coupled. The tunnel database of the peripheral processing device can be dynamically built as the peripheral processing device requests tunnel values from the edge device. For example, each time the peripheral processing device receives a tunnel value associated with a physical address value the peripheral processing device can store this association in its tunnel database. Similarly stated, receiving a tunnel value associated with a physical address value can trigger a peripheral processing device to store the tunnel value and the associated physical address value in a memory (e.g., a tunnel database) local to the peripheral processing device. In such embodiments, if a source peripheral processing device sends a second data packet to a destination peripheral processing device, the source peripheral processing device can retrieve the tunnel value associated with the physical address value of the destination peripheral processing device from its tunnel database rather than requesting the tunnel value from the edge device. This can reduce the number of requests made of the edge devices by the peripheral processing devices.

In some embodiments, associations between tunnel values and physical address values can be removed from the tunnel database of a peripheral processing device when the association has not been used for a given period. In some embodiments, such a period can be defined by a time limit. In such embodiments, if the peripheral processing device has not sent a data packet having a particular physical address value to the edge device within a time limit (e.g., 5 seconds), the association between the physical address value and its tunnel value can be removed from the tunnel database of the peripheral processing device. In other embodiments, the period can be defined by a number of packets sent to the edge device, a size of data packets sent to the edge device, and/or the like.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute nodes can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system, comprising:
an edge device configured to be operatively connected to a switch fabric, the edge device defining at least a portion of a core portion of a data center,
the edge device configured to receive a request for a tunnel value from a source peripheral processing device disposed outside of the core portion of the data center, the request including a physical address value representing a destination of a packet queued at the source peripheral processing device, the tunnel value representing a physical address space including a plurality of physical address values, the physical address value being included in the plurality of physical address values,
the edge device configured to determine, in response to the request, the tunnel value without sending the physical address value to the remaining portion of the data center,
the edge device configured to send, in response to the request, the tunnel value to the source peripheral processing device.

2. The system of claim 1, wherein the edge device is configured to receive the packet from the source peripheral processing device after the packet has been modified at the source peripheral processing device based on the tunnel value.

3. The system of claim 1, wherein the edge device is configured to send, in response to the request, the tunnel value to a virtual line-card associated with the source peripheral processing device.

4. The system of claim 1, wherein the edge device is a first edge device, the system further comprising:
a second edge device operatively connected to the destination,
the switch fabric configured to route the packet to the second edge device based on the tunnel value when the tunnel value is associated with the packet.

5. The system of claim 1, further comprising:
a control plane device configured to define the tunnel value based on a portion of a topology of the core portion of the data center associated with the physical address space,
the control plane device configured to send the tunnel value to the edge device based on the edge device being associated with a virtual local area network including the physical address space.

6. The system of claim 1, wherein the edge device is a first edge device, the system further comprising:
a second edge device configured to receive the packet when the packet is routed by the switch fabric to the second edge device based on the tunnel value,
the second edge device configured to send the packet, without the tunnel value, to the destination based on the physical address value included in the packet.

7. The system of claim 1, further comprising:
a control plane device configured to update the tunnel value in response to a change in a topology of peripheral processing devices operatively connected to the core portion of the data center, the control plane device configured to send the updated tunnel value to the edge device.

8. The system of claim 1, further comprising:
the switch fabric, the switch fabric being a multi-stage switch fabric that includes at least three switch stages.

9. The system of claim 1, wherein the edge device is a first edge device, the system further comprising:

a second edge device; and a control plane device configured to define, before the request for the tunnel value is received at the first edge device, the tunnel value in response to the destination being operatively connected to the second edge device.

10. The system of claim 1, wherein the physical address value is a media access control (MAC) address value.

11. An apparatus, comprising: a memory of an ingress edge device configured to be operatively coupled to a switch fabric, the memory storing a tunnel database including a plurality of tunnel values, the plurality of tunnel values including a tunnel value representing a physical address space associated with a first plurality of peripheral processing devices operatively connected to an egress edge device that is operatively connected to the switch fabric; a plurality of ports of the ingress edge device, each port from the plurality of ports configured to be operatively connected to a peripheral processing device from a second plurality of peripheral processing devices; and a processor of the ingress edge device configured to receive, from a source peripheral processing device from the second plurality of peripheral processing devices, a request including an address value of a destination peripheral processing device from the first plurality of peripheral processing devices, the processor configured to send the tunnel value from the memory to the source peripheral processing device from the second plurality of peripheral processing devices via a single-hop link when the address value is included in the physical address space.

12. The apparatus of claim 11, further comprising: the processor of the ingress edge device configured to receive from the source peripheral processing device a packet associated with the tunnel value, the processor configured to send the packet to a stage of the switch fabric based on the tunnel value.

13. The apparatus of claim 11, wherein the tunnel database stored at the memory of the ingress edge device is a subset of a database maintained at a control plane device.

14. The apparatus of claim 11, wherein the tunnel database stored at the memory of the ingress edge device is a subset of a database maintained at a control plane device, the subset of the database includes a plurality of entries selected from the database based on a network preference.

15. The apparatus of claim 11, wherein the processor is configured to update at least a portion of the tunnel database in response to a change in a topology of at least a portion of the first plurality of peripheral processing devices operatively connected to the egress edge device.

16. The apparatus of claim 11, wherein the tunnel value is at least one of an address value or a bit-mask value.

17. The apparatus of claim 11, wherein the tunnel value is sent from the processor to the source peripheral processing device via an in-band signaling channel.

18. A non-transitory processor-readable medium storing code representing instructions to be executed by a processor, the code comprising code to:

determine at a first peripheral processing device at least a portion of a packet including a physical address value representing at least a portion of a second peripheral processing device;

send to an ingress edge device of a switch fabric a request for a tunnel value representing a physical address space including a plurality of physical address values, the physical address value being included in the plurality of physical address values, the request including the physical address value;

receive the tunnel value in response to the request without the physical address value being sent to a device separate from the ingress edge device; and modify the packet based on the tunnel value such that the packet is routed, based on the tunnel value, through the switch fabric to an egress edge device operatively connected to the second peripheral processing device.

19. The non-transitory processor-readable medium of claim 18, wherein the request is sent to the ingress edge device via an Ethernet link.

20. The non-transitory processor-readable medium of claim 18, wherein the packet is a first packet, the physical address value is a first physical address value, the code further comprising code to:

trigger storage of the tunnel value in a memory local to the first peripheral processing device; and retrieve the tunnel value from the memory in response to a physical address value of a second packet being associated with the physical address space.

* * * * *